United States Patent
Itou et al.

[11] Patent Number: 5,880,575
[45] Date of Patent: Mar. 9, 1999

[54] CHARGE-DISCHARGE CONTROL CIRCUIT, OVER-CHARGE PREVENTION CIRCUIT, AND OVER-DISCHARGE PREVENTION CIRCUIT

[75] Inventors: Tsukasa Itou; Satoshi Narukawa, both of Sumoto, Japan

[73] Assignee: Sanyo Electric Co., Ltd., Osaka, Japan

[21] Appl. No.: 784,901

[22] Filed: Jan. 16, 1997

[30] Foreign Application Priority Data

Feb. 13, 1996 [JP] Japan ................................ 8-025116
Nov. 8, 1996 [JP] Japan ................................ 8-296828

[51] Int. Cl.[6] ................................................ H01M 10/46
[52] U.S. Cl. .............................................................. 320/122
[58] Field of Search .................................... 320/116, 117, 320/118, 119, 120, 122, 128, 134, 136, 105, 114

[56] References Cited

U.S. PATENT DOCUMENTS 5,180,641 1/1993 Burns et al. .
5,206,578 4/1993 Nor ............................................ 320/118
5,498,950 3/1996 Ouwerkerk ................................ 320/119
5,656,915 8/1997 Eaves ................................... 320/120 X

FOREIGN PATENT DOCUMENTS

| 512 340 | 4/1992 | European Pat. Off. . |
| 0 588 615 | 3/1994 | European Pat. Off. . |
| 0 589 287 | 3/1994 | European Pat. Off. . |
| 7-163060 | 6/1995 | Japan . |
| 430791 | 6/1935 | United Kingdom . |
| 92/06525 | 4/1992 | WIPO . |
| 95/15604 | 6/1995 | WIPO . |

*Primary Examiner*—Edward H. Tso
*Attorney, Agent, or Firm*—Wenderoth, Lind & Ponack, L.L.P.

[57] ABSTRACT

The charge-discharge control circuit prevents over-charge and over-discharge of a plurality of series connected batteries. It is provided with a detection circuit to determine the state of charge and discharge of the batteries, at least one bypass circuit connected in parallel with one of the batteries, and a connection circuit which, in response to results from the detection circuit, selectively connects the bypass circuit to a battery determined to be in an approximately fully charged state or approximately fully discharged state.

30 Claims, 4 Drawing Sheets

CHARGE-DISCHARGE CONTROL CIRCUIT, OVER-CHARGE PREVENTION CIRCUIT, AND OVER-DISCHARGE PREVENTION CIRCUIT

BACKGROUND OF THE INVENTION

This invention relates to an over-charge prevention circuit, an over-discharge prevention circuit and a charge-discharge control circuit for preventing battery over-charge or over-discharge in a plurality of series connected batteries.

When a plurality of series connected batteries are charged or discharged, variation in the characteristics of each battery presents the problem that one battery may over-charge or over-discharge. Specifically, when one battery of a plurality of series connected batteries has lower capacity than the other batteries, battery charging will continue while the battery unit is not fully charged even though the low capacity battery has reached full charge. As a result, the low capacity battery will become over-charged. Similarly, when the battery unit is in a state that allows discharge, discharge will continue even though the low capacity battery has reached a state where discharge should be suspended. This will subject the low capacity battery to over-discharge.

Japanese Non-examined Patent Publication No.7-163060 issued Jun. 23, 1995 discloses circuitry to prevent over-charge or over-discharge of all batteries of a plurality of series connected batteries and to leave all batteries in the same state of charge or discharge. To avoid over-charging or over-discharging any battery of a plurality of series connected batteries having battery variation, the circuitry cited in this disclosure provides over-charge prevention circuits and over-discharge prevention circuits for each battery. An over-charge prevention circuit is made up of a diode connected in series with the battery, a switching device to bypass charging current, and a voltage detector to control the on-off state of the switching device. An over-discharge prevention circuit is made up of a switching device connected in series with the battery, a diode to bypass discharge current, and a voltage detector to control the on-off state of the switching device.

This circuitry prevents over-charging of a low capacity battery by operation of the over-charge prevention circuit corresponding to that battery to bypass charging current away from that low capacity battery when it becomes fully charged. Other batteries continue to charge to full charge without over-charging.

Similarly during discharge, over-discharge of a low capacity battery is prevented by operation of the corresponding over-discharge prevention circuit to bypass the low capacity battery's discharge current when it has reached a state where discharge should be suspended. Other batteries continue to discharge without over-discharge of any of the batteries.

In this manner, circuitry of the above mentioned disclosure prevents over-charge and over-discharge of all the series connected batteries. However, because an over-charge prevention circuit and an over-discharge prevention circuit are provided for each battery, the number of circuit components is large and the circuit structure is extremely complex.

Further, since the diodes which are components of the over-charge prevention circuits connect in series with the batteries, there is energy loss associated with these diodes. In particular, this energy loss increases as the number of batteries connected in series increases. In addition, the switching devices which are components of the over-discharge prevention circuits and are connected in series with the batteries must be of a type specified to withstand the discharge current.

It is thus an object of the present invention to present a circuit of simple structure which prevents over-charge and over-discharge of a plurality of series connected batteries.

The above and further objects and features of the invention will more fully be apparent from the following detailed description with accompanying drawings.

SUMMARY OF THE INVENTION

The over-charge prevention circuit of the present invention which prevents over-charge of a plurality of series connected batteries is characterized by a detection circuit which successively determines the charge state of each battery, at least one bypass circuit connected in parallel with one of the series connected batteries, and a connection circuit which selectively connects an approximately full charged battery to a bypass circuit in response to results from the detection circuit.

Similarly, the over-discharge prevention circuit of the present invention which prevents over-discharge of a plurality of series connected batteries is characterized by a detection circuit which successively determines the state of discharge of each battery, at least one bypass circuit connected in parallel with one of the series connected batteries, and a connection circuit which, in response to results from the detection circuit, selectively connects an essentially fully discharged battery to a bypass circuit.

Finally, the over-charge and discharge control circuit of the present invention which prevents over-charge and over-discharge of a plurality of series connected batteries is characterized by a detection circuit which successively determines the state of charge and discharge of each battery, at least one bypass circuit connected in parallel with one of the series connected batteries, and a connection circuit which, in response to results from the detection circuit, selectively connects an approximately fully charged or fully discharged battery to a bypass circuit.

The circuitry of the present invention successively detects the most charged or discharged battery amongst the plurality of series connected batteries. By selective connection of the most charged or discharged battery to a bypass circuit, complex circuit structure is unnecessary, and all batteries can be charged or discharged uniformly while preventing over-charge and over-discharge.

Furthermore, by integrating the detector circuit, bypass circuit, and connection circuit into a single unit, circuit structure can be simplified.

DETAILED DESCRIPTION OF THE INVENTION

Figure 1:
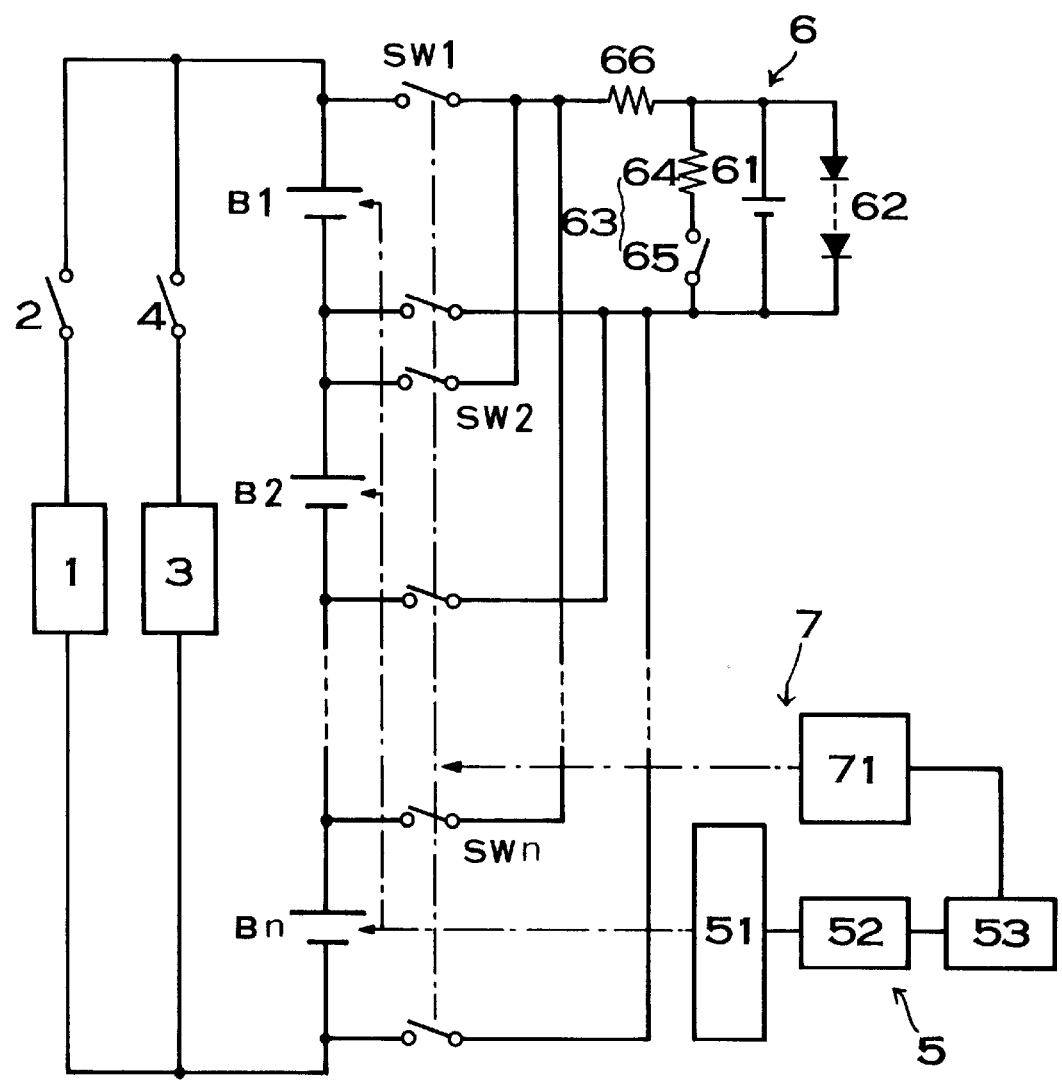
FIG. 1 is a block circuit diagram showing an embodiment of the present invention.

Turning to FIG. 1, a block diagram of an embodiment of the present invention is shown. B1 through Bn are a plurality of series connected batteries such as nickel cadmium, nickel hydride, or lithium ion batteries to be charged. Component 1 is a charging circuit for charging batteries B1 through Bn and comprises well known circuits such as constant current and/or constant voltage charging circuits depending on the battery type. Component 2 is a charging switch inserted between the charging circuit 1 and the batteries, component 3 is a load driven by the batteries, and component 4 is a discharge switch inserted between the load 3 and the batteries.

Component 5 is a detection circuit to determine the charge and discharge state of each battery B1 through Bn. The detection circuit is made up of a voltage detection circuit 51 to sequentially sense the battery voltage of each battery, an A/D converter circuit 52 to convert the detected analog battery voltage to a digital value, and a monitoring circuit 53 to monitor the charge and discharge state of each battery based on the battery voltage output from the A/D converter 52.

The monitoring circuit 53 comprises a micro-computer. During battery charge, the monitoring circuit 53 monitors the charge state of each battery B1 through Bn based on the battery voltage sequentially sensed by the voltage detection circuit 51. For example, the charge state of each battery is sequentially monitored by the rate of change of battery voltage as it increases with charging. When any of the batteries B1 through Bn reach approximately full charge (for example, 70–90% charged), a detection signal is issued.

Conversely, during battery discharge the monitoring circuit 53 monitors the state of discharge of the batteries B1 through Bn. Specifically, a detection signal is issued when a battery's voltage drops to a specified voltage.

The state of charge or discharge when the detection signal is output is set appropriate to the amount of charging or discharging current. For example, the specified voltage for detection signal output during battery discharge is set approximately inversely proportional to the amount of discharge current from batteries B1 through Bn.

Component 6 is a bypass circuit which is connected in parallel with one of the batteries B1 through Bn. This bypass circuit 6 comprises an auxiliary battery 61 which is the same type as the plurality of batteries B1 through Bn, a series of diodes 62 connected in parallel with the auxiliary battery 61, a discharge circuit 63, connected in parallel with the diodes 62 and the auxiliary battery 61, which is made up of a series connected discharge resistor 64 and discharge switch 65, and a current-limiting resistor 66 connected in series with the auxiliary battery 61.

The auxiliary battery 61 is charged by charging current bypassed through the bypass circuit 6 when batteries B1 through Bn are charged, and discharged when batteries B1 through Bn discharged. It is desirable for the auxiliary battery 61 to be the same as the batteries B1 through Bn to be charged. If batteries B1 through Bn are nickel cadmium batteries, then the auxiliary battery 61 should also be a nickel cadmium battery. Further, the auxiliary battery 61 may have the same equivalent battery capacity as one of the batteries B1 through Bn, but 15% to 50% of that capacity is sufficient. Finally, as discussed later, since the auxiliary battery 61 is exposed to severe charge and discharge states and since its probability of early degradation is high, it should be easy to replace.

The diodes 62 and the discharge circuit 63 are components which prevent over-charge of the auxiliary battery 61 by bypassed charging current during charging of batteries B1 through Bn. The diodes 62 prevent auxiliary battery 61 over-charge by conducting when auxiliary battery voltage reaches a specified voltage. The discharge circuit 63 prevents over-charge degradation by suitably discharging the auxiliary battery 61 by switching the discharge switch to the on state.

Component 7 is a connection circuit which, in response to results from the detection circuit 5, connects a bypass circuit 6 to a battery of the B1 through Bn group determined to be approximately fully charged or fully discharged. The connection circuit 7 is made up of selection switches SW1 through SWn and a switching circuit 71. Either relay switches or semiconductor switches are used as the selection switches SW1 through SWn.

The following describes operation of this circuitry first during charging of batteries B1 through Bn. Corresponding to the start of charging, the selection switches SW1 through SWn are all put in the off state. In the bypass circuit 6, the discharge switch 65 is initially put in the on state to leave the auxiliary battery 61 in a sufficiently discharged state.

Subsequently, the charging switch 2 is put in the on state and charging of batteries B1 through Bn is started. When charging starts, the voltage detection circuit 51 periodically senses the battery voltage of each battery B1 through Bn in a sequential manner and outputs these voltages to the A/D converter 52. The monitoring circuit 53 monitors the charge state of each battery based on each battery voltage obtained via the A/D converter 52.

If the batteries B1 through Bn all have the same characteristics and their charge states all transition in the same manner, there are no problems. However, when this is not the case, one of the batteries B1 through Bn (the lowest capacity battery) will approach a fully charged state more rapidly. When one of the batteries B1 through Bn (hypothetically battery B1) reaches approximately full charge (70% to 90% charged), the monitoring circuit 53 outputs a detection signal.

The switching circuit 71 responds to the detection signal by turning selection switch SW1 to the on state to connect the bypass circuit 6 in parallel to battery B1. Consequently, part of any subsequent charging current flowing in battery B1 now flows to the auxiliary battery 61 of the bypass circuit 6. As a result, charging current flowing in battery B1 is reduced compared to the other batteries B2 through Bn and battery B1 over-charge is prevented. Meanwhile, there is no change in charging current flowing in the other batteries B2 through Bn and their normal charging continues.

Subsequently, if the detection circuit 5 senses that one of the batteries B2 through Bn not connected to the bypass circuit 6 (hypothetically battery B2) is closer to full charge than battery B1, the connection circuit 7 changes the bypass circuit 6 connection from B1 to B2.

In this manner, whenever the battery for which charging has progressed furthest is determined, it is connected to the bypass circuit 6. This results in a uniform state of charge for all the batteries B1 through Bn without over-charge.

Next, circuit operation during battery B1 through Bn discharge is described. Corresponding to the start of discharge, the selection switches SW1 through SWn are all put in the off state. The discharge switch 4 is put in the on state and discharge of batteries B1 through Bn is started. The voltage detection circuit 51 periodically senses the battery voltage of each battery B1 through Bn in a sequential manner and outputs these voltages to the A/D converter 52. The monitoring circuit 53 monitors the discharge state of each battery based on each battery voltage obtained via the A/D converter 52.

The monitoring circuit 53 issues a detection signal when the voltage of one of the batteries (hypothetically battery B1) drops to the specified voltage. The switching circuit 71 responds to the detection signal by turning selection switch SW1 to the on state connecting the bypass circuit 6 in parallel to battery B1. Connected to the bypass circuit 6, battery B1 is relieved by the auxiliary battery 61 which accepts part of the discharge current. Consequently, the discharge rate of battery B1 is decreased, its voltage drop is alleviated, and its over-discharge is prevented.

Subsequently, if the detection circuit 5 senses that one of the batteries B2 through Bn not connected to the bypass circuit 6 (hypothetically battery B2) is in a deeper state of discharge than battery B1, the connection circuit 7 changes the bypass circuit 6 connection from B1 to B2.

In this manner, whenever the battery for which discharge has progressed furthest is determined, it is connected to the bypass circuit 6. This results in a uniform state of discharge for all the batteries B1 through Bn without over-discharge.

Although in this embodiment only one bypass circuit 6 is provided, two or three bypass circuits may be provided in the case where a large number of batteries are connected in series. However, from the perspective of avoiding complex circuitry, it is best to minimize the number of bypass circuits.

Figure 2:
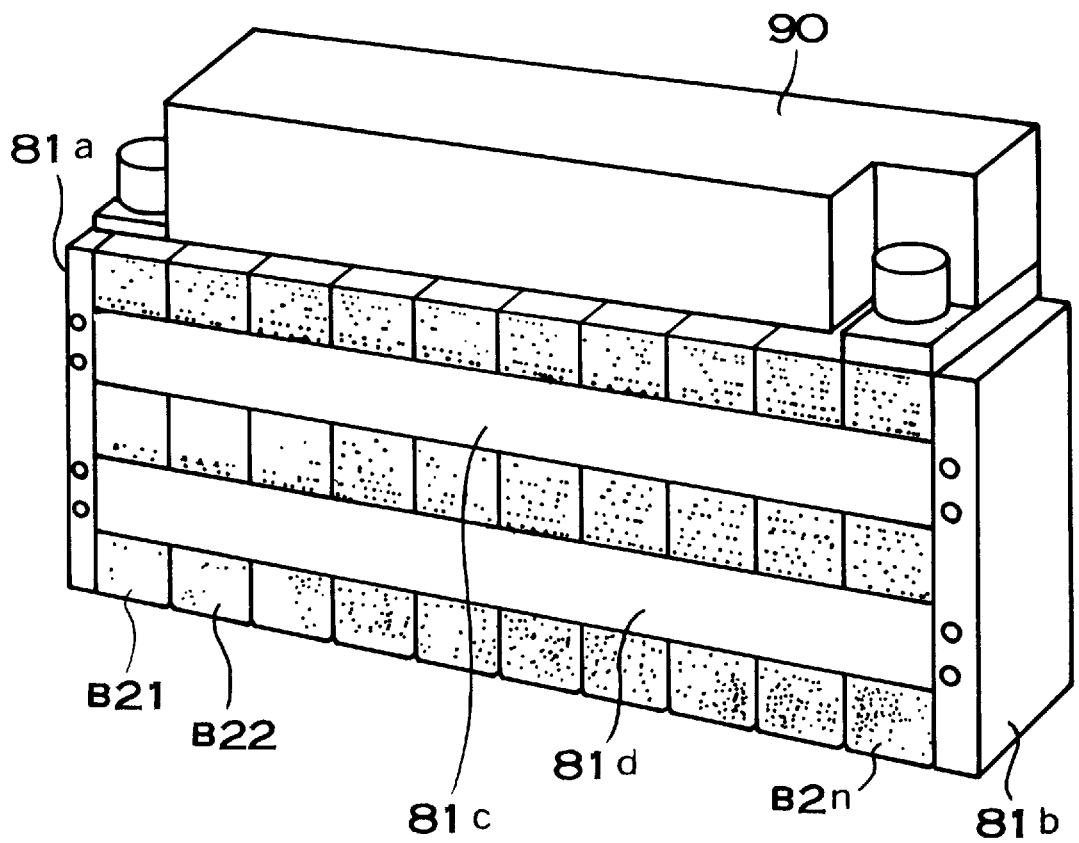
FIG. 2 is an oblique view showing an embodiment of the present invention.
Figure 3:
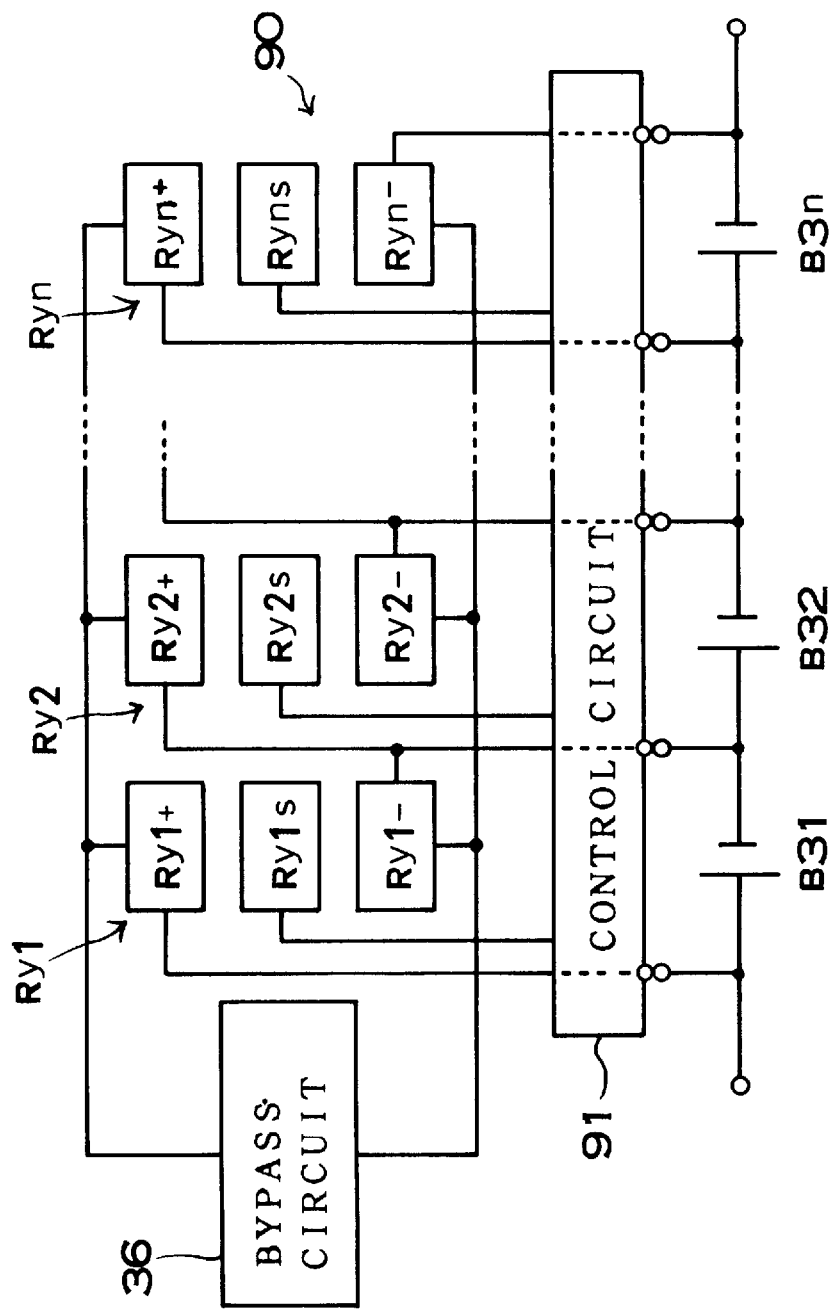
FIG. 3 is a block circuit diagram showing another embodiment of the present invention.

Turning to FIGS. 2 and 3, an oblique view and a block diagram of a plurality of batteries (B21 through B2n and B31 through B3n) connected as battery arrays are shown which integrate the detection circuit, bypass circuit, and connection circuit of FIG. 1 as a single unit. In FIG. 2, rectangular batteries B21 through B2n (ten batteries in this embodiment) are arranged in a linear fashion and held together as a unit by restraining pieces 81a through 81d. Each battery B21 through B2n is electrically connected in series, and the positive and negative terminals of each battery are accessible at the upper surface.

A control box 90 is mounted on the supper surface of exposed battery terminals and appropriately connected to the positive and negative terminals of batteries B21 through B2n. The control box 90 is a single structure which integrates the detection circuit, the bypass circuit, and the connection circuit. In FIG. 3, the detection circuit and the switching circuit of the connection circuit are shown as a single block which is the control circuit 91. The control circuit 91 is connected with batteries B31 through B3n.

The selection switches which make up the connection circuit are n relay switches Ry1 through Ryn. The relay switches Ry1 through Ryn are each made up of positive relay terminals Ry1+ through Ryn+ provided at the positive terminal sides of batteries B31 through B3n, negative relay terminals Ry1− through Ryn− provided at the negative terminal sides of batteries B31 through B3n, and relay control terminals Ry1s through Ryns which turn the positive relay terminals Ry1+ through Ryn+ and the negative relay terminals Ry1− through Ryn− on and off. The relay control terminals Ry1s through Ryns are in turn controlled by the switching circuit of the control circuit 91. For example, if an on signal is issued to relay control terminal Ry1s, positive relay terminal Ry1+ and negative relay terminal Ry1− are switched to the on state and bypass circuit 36 is connected in parallel with battery B31.

In this manner, by integrating the detection circuit, the bypass circuit, and the connection circuit as a single control box 90, the configuration is simplified.

Now, a battery array of ten (n=10) series connected hermetically sealed rectangular nickel cadmium batteries each with a rated capacity of 100Ah and a rated voltage of 1.2V was prepared. In addition, a hermetically sealed cylindrical nickel cadmium battery with a rated capacity of 20Ah and a rated voltage of 1.2V was prepared as the auxiliary battery of the bypass circuit.

This system was then subjected to repeated constant current charging at 10A and constant current discharging at 20A. The results for the battery with the most severely degraded battery capacity of the ten are shown in Table 1 along with results for a prior art system (not provided with the bypass circuit of the present invention). Here, full charge was determined to cease constant current charging by an appropriate well known method such as the battery voltage detection method, the temperature sensing method, the −ΔV method, or the peak detection method. Correspondingly, constant current discharge was terminated when the voltage of the battery array became 10V.

TABLE 1

|  | Prior Art | Embodiment of the Present Invention |
|---|---|---|
| Initial Capacity | 110 Ah | 110 Ah |
| Capacity at 300 cycles | 12 Ah | 108 Ah |
| Capacity at 600 cycles | 58 Ah | 103 Ah |
| Capacity at 900 cycles | — | 98 Ah |

From Table 1, it is clear that the prior art showed drastic reduction in battery capacity as the number of charge-discharge cycles increased. At 600 cycles, initial battery capacity had dropped approximately 50%, and at 900 cycles, battery capacity data could not be obtained. However, at 900 charge-discharge cycles of the embodiment of the present invention, battery capacity had dropped no more than about 10% relative to the initial capacity. From Table 1, it is clear that the embodiment of the present invention prevents over-charge and over-discharge of batteries B1 through Bn.

Figure 4:
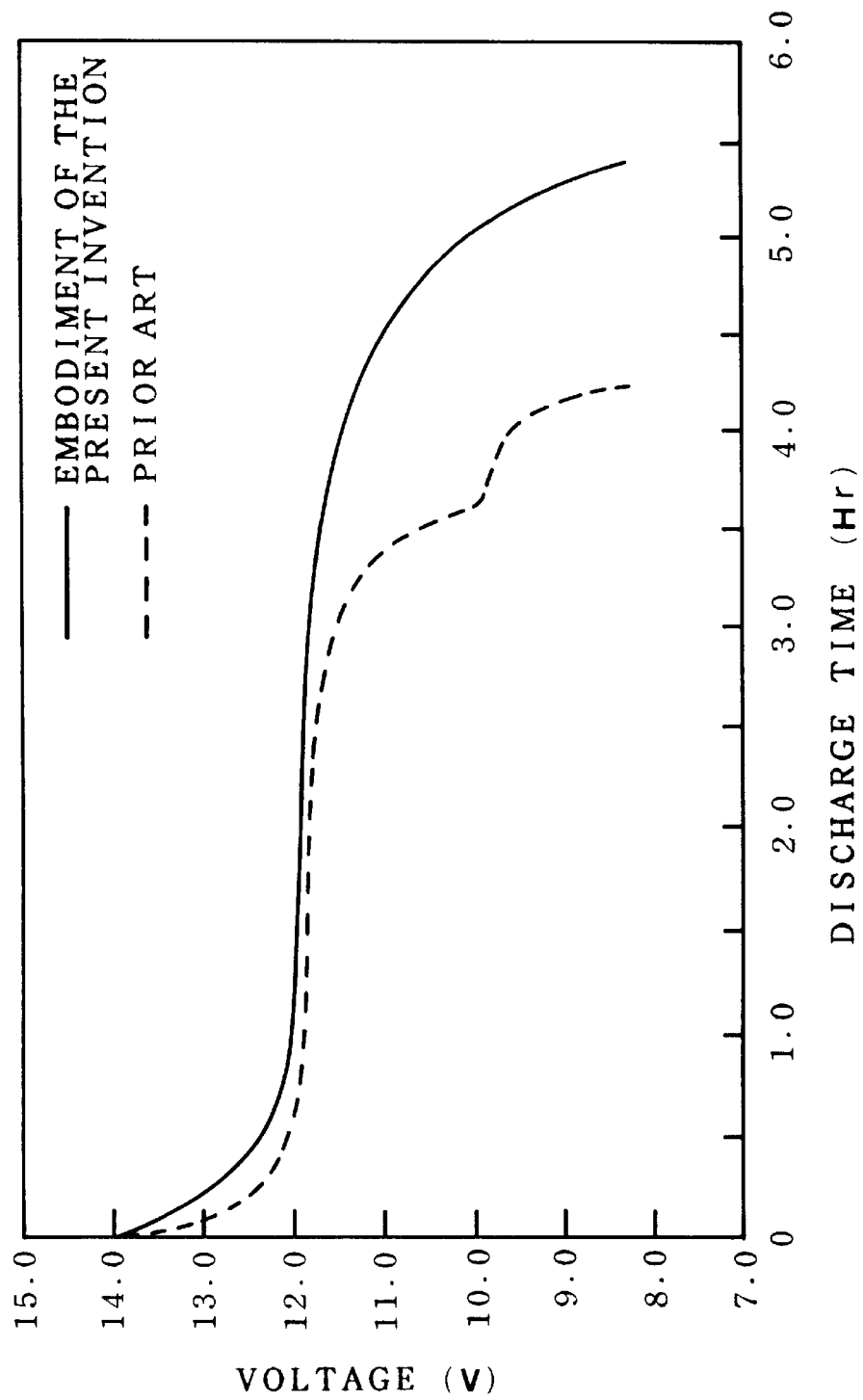
FIG. 4 is a graph showing discharge curves for an embodiment of the present invention.

Finally turning to FIG. 4, discharge curves for battery arrays at 300 charge-discharge cycles are shown. As shown in FIG. 4, battery voltage for the prior art drops rapidly after about 3.5 hrs and a two-stage voltage drop is observed. The embodiment of the present invention, however, transitions to about 5 hrs before rapid voltage drop.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A charge-discharge control circuit for preventing over-charge and over-discharge of a plurality of series connected batteries comprising:

(1) a detection circuit for determining the state of charge and discharge of the plurality of series connected batteries;

(2) at lease one bypass circuit connected in parallel with one of the series connected batteries, said at least one bypass circuit including a rechargeable auxiliary battery and associated over-charge protection components connected in parallel with the auxiliary battery; and (3) a connection circuit which, in response to detection results from said detection circuit, selectively connects said at least one bypass circuit to one of said plurality of series connected batteries determined to be in an approximately fully charged state or approximately fully discharged state.

2. A charge-discharge control circuit as defined in claim 1 wherein the at least one bypass circuit is provided with a discharge circuit in parallel with the auxiliary battery.

3. A charge-discharge control circuit as defined in claim 1 wherein the detection circuit senses battery voltage to detect one of said plurality of series connected batters being in an approximately fully charged state or approximately fully discharged state.

4. A charge-discharge control circuit as defined in claim 3 wherein the detection circuit is provided with a voltage detection circuit for sequentially sensing the battery voltage of each of the plurality of series connected batteries, an A/D converter circuit for converting the detected battery voltage to a digital value, and a monitoring circuit for monitoring the charge and discharge state of each of the plurality of series connected batteries based on the battery voltage output from the A/D converter.

5. A charge-discharge control circuit as defined in claim 1 wherein the connection circuit is provided with selection switches for connecting one of the plurality of series connected batteries to the at least one bypass circuit, and a switching circuit for switching said selection switches.

6. A charge-discharge control circuit as defined in claim 1 wherein said detecting circuit, said at least one bypass circuit, and said connection circuit are integrated into a single unit and connected to said plurality of series connected batteries.

7. An over-charge prevention circuit for preventing over-charge of a plurality of series connected batteries comprising:
  (1) a detection circuit for determining the state of charge of each of the plurality of series connected batteries being charged;
  (2) at least one bypass circuit connected in parallel with one of the series connected batteries, said at least one bypass circuit including a rechargeable auxiliary battery and associated over-charge protection components connected in parallel with the auxiliary battery; and
  (3) a connection circuit which, in response to detection results from said detection circuit, selectively connects said at least one bypass circuit to one of said plurality of series connected batteries determined to be in an approximately fully charged state.

8. An over-charge prevention circuit as defined in claim 7 wherein the at least one bypass circuit is provided with a discharge circuit in parallel with the auxiliary battery.

9. An over-charge prevention circuit as defined in claim 7 wherein the detection circuit senses battery voltage to detect one of the plurality of series connected batteries being in an approximately fully charged state.

10. An over-charge prevention circuit as defined in claim 9 wherein the detection circuit is provided with a voltage detection circuit for sequentially sensing the battery voltage of each of the plurality of series connected batteries, an A/D converter circuit for converting the detected battery voltage to a digital value, and monitoring circuit for monitoring the charge state of each of the plurality of series connected batteries based on the battery voltage output from the A/D converter.

11. An over-charge prevention circuit as defined in claim 7 wherein the connection circuit is provided with selecting switches for connecting one of the plurality of series connected batteries to the at least one bypass circuit, and a switching circuit for switching said selection switches.

12. An over-charge prevention circuit as defined in claim 7 wherein said detection circuit, said at least one bypass circuit, and said connection circuit are integrated into a single unit and connected to said plurality of series connected batteries.

13. An over-discharge prevention circuit for preventing over-discharge of a plurality of series connected batteries comprising:
  (1) a detection circuit for determining the state of discharge of each of the plurality of series connected batteries being charged;
  (2) at least one bypass circuit connected in parallel with one of the series connected batteries, said at least one bypass circuit including a rechargeable auxiliary battery and associated over-charge protection components connected in parallel with the auxiliary battery; and
  (3) a connection circuit which, in response to detection results from said detection circuit, selectively connects said at least one bypass circuit to one of said plurality of series connected batteries determined to be in an approximately fully discharged state.

14. An over-discharge prevention as defined in claim 13 wherein the at least one bypass circuit is provided with a discharge circuit in parallel with the auxiliary battery.

15. An over-discharge prevention circuit as defined in claim 13 wherein the detection circuit senses battery voltage to detect one of the plurality of series connected batteries being in an approximately fully discharged state.

16. An over-discharge prevention circuit as defined in claim 15 wherein the detection circuit is provided with a voltage detection circuit for sequentially sensing the battery voltage of each of the plurality of series connected batteries, an A/D converter circuit for converting the detected battery voltage to a digital value, and a monitoring circuit for monitoring the discharge state of each of the plurality of series connected batteries based on the battery voltage output from the A/D converter.

17. An over-discharge prevention circuit as defined in claim 13 wherein the connection circuit is provided with selection switches for connecting one of the plurality of series connected batteries to the at least one bypass circuit, and a switching circuit for switching said selection switches.

18. An over-discharge prevention circuit as defined in claim 13 wherein said detection circuit, said at least one bypass circuit, and said connection circuit are integrated into a single unit and connected to said plurality of series connected batteries.

19. A charge-discharge control circuit for preventing over-charge and over-discharge of a plurality of series connected batteries comprising:
  (1) a detection circuit for determining the state of charge and discharge of the plurality of series connected batteries;
  (2) at least one bypass circuit connected in parallel with one of the plurality of series connected batteries, and the number of bypass circuits is less than the number of series connected batteries; and
  (3) a connection circuit which, in response to detection results from the detection circuit, selectively connects said at least one bypass circuit to one of the plurality of series connected batteries determined to be in an approximately fully charged stated and in the most advancedly charged state when the batteries are being charged and to one of the plurality of series connected batteries determined to be in an approximately fully discharged state and in the most advancedly discharged state when the batteries are being discharged.

20. A charge-discharge control circuit as defined in claim 19 wherein the detection circuit senses battery voltage to detect one of said plurality of series connected batteries being in an approximately fully charged state or approximately fully discharged state.

21. A charge-discharge control circuit as defined in claim 19 wherein the connection circuit is provided with selection switches for connecting one of the plurality of series connected batteries to the at least one bypass circuit, and a switching circuit for switching said selection switches.

22. A charge-discharge control circuit as defined in claim 19 wherein said detecting circuit, said at least one bypass circuit, and said connection circuit are integrated into a single unit and connected to said plurality of series connected batteries.

23. An over-charge prevention circuit for preventing over-charge of a plurality of series connected batteries comprising:
   (1) a detection circuit for determining the state of charge of each of the plurality of series connected batteries being charged;
   (2) at least one bypass circuit connected in parallel with one of the plurality of series connected batteries, and the number of bypass circuits is less than the number of series connected batteries; and
   (3) a connection circuit which, in response to detection results from the detection circuit, selectively connects the at least one bypass circuit to one of the plurality of series connected batteries determined to be in an approximately fully charged state and in the most advancedly charged state.

24. An over-charge prevention circuit as defined in claim 23 wherein the detection circuit senses battery voltage to detect one of the plurality of series connected batteries being in an approximately fully charged state.

25. An over-charge prevention circuit as defined in claim 23 wherein the connection circuit is provided with selecting switches for connecting one of the plurality of series connected batteries to the at least one bypass circuit, and a switching circuit for switching said selection switches.

26. An over-charge prevention circuit as defined in claim 23 wherein said detection circuit, said at least one bypass circuit, and said connection circuit are integrated into a single unit and connected to said plurality of series connected batteries.

27. An over-discharge prevention circuit for preventing over-discharge of a plurality of series connected batteries comprising:
   (1) a detection circuit for determining the state of discharge of each of the plurality of series connected batteries being charged;
   (2) at least one bypass circuit connected in parallel with one of the plurality of series connected batteries, and the number of bypass circuits is less than the number of series connected batteries; and
   (3) a connection circuit which, in response to detection results from the detection circuit, selectively connects the at least one bypass circuit to one of the plurality of series connected batteries determined to be in an approximately fully discharged state and in the most advancedly discharged state.

28. An over-discharge prevention circuit as defined in claim 27 wherein the detection circuit senses battery voltage to detect one of the plurality of series connected batteries being in an approximately fully discharged state.

29. An over-discharge prevention circuit as defined in claim 27 wherein the connection circuit is provided with selection switches for connecting one of the plurality of series connected batteries to the at least one bypass circuit, and a switching circuit for switching said selection switches.

30. An over-discharge prevention circuit as defined in claim 27 wherein said detection circuit, said at least one bypass circuit, and said connection circuit are integrated into a single unit and connected to said plurality of series connected batteries.

* * * * *